United States Patent [19]
Polaert et al.

[11] Patent Number: 5,510,784
[45] Date of Patent: Apr. 23, 1996

[54] TOUCH CONTROL DEVICE AND KEYBOARD

[75] Inventors: Rémy Polaert, Villecresnes; François Maniguet, Marles en Brie, both of France

[73] Assignee: U.S. Philips Corporation, New York, N.Y.

[21] Appl. No.: 135,774

[22] Filed: Oct. 12, 1993

[30] Foreign Application Priority Data

Nov. 25, 1992 [FR] France .................................. 92 14188

[51] Int. Cl.⁶ ............................................. H03K 17/965
[52] U.S. Cl. ......................... 341/34; 341/20; 341/22; 200/181; 73/862.634; 73/865.7
[58] Field of Search ............................. 341/20, 21, 22, 341/34; 200/5 A, 181; 345/174, 173, 156; 178/18; 73/862.632, 862.634, 862.639, 865.7

[56] References Cited

U.S. PATENT DOCUMENTS

| | | | |
|---|---|---|---|
| 4,503,294 | 3/1985 | Matsumaru | 200/5 A |
| 4,550,384 | 10/1985 | Kimura | 364/556 |
| 4,706,536 | 11/1987 | Sanders | 200/5 A |
| 5,038,142 | 8/1991 | Flowers et al. | 341/34 |
| 5,047,952 | 9/1991 | Kramer et al. | 341/20 |

FOREIGN PATENT DOCUMENTS

| | | |
|---|---|---|
| 0540094 | 5/1993 | European Pat. Off. . |
| 2114810 | 8/1983 | United Kingdom . |
| 2133218 | 7/1984 | United Kingdom . |

*Primary Examiner*—John K. Peng
*Assistant Examiner*—Daniel J. Wu
*Attorney, Agent, or Firm*—Michael J. Balconi-Lamica

[57] ABSTRACT

A touch control device comprising a plate (10) in which at least one portion (14) is partly cut (12) such that it can be inclined around at least one remaining connection area (15). Strain gauges (17) render it possible to measure the intensity of a force (F) applied to the said portion (14). Applications include the control of various equipment such as TVs and other items.

6 Claims, 5 Drawing Sheets

TOUCH CONTROL DEVICE AND KEYBOARD

BACKGROUND AND SUMMARY OF THE INVENTION

1. Field of the Invention

The invention relates to a touch control device comprising a plate capable of receiving an applied force, at least one slit which surrounds a partly cut-out portion in the plate while retaining a connection area with a remaining portion of the plate, and strain gauge detectors for supplying measurement signals which are a measure of deformations of the plate.

Such a device is used for supplying commands to a command reception unit.

The invention also relates to a keyboard in which a plurality of touch control devices are used.

2. Background of the Invention

U.S. Pat. No. 4,550,384 describes a device which supplies the coordinates of a point of application of a force on a surface. To achieve this, the surface is provided with four straight slits arranged in four corners of a plate, which slits cut through the plate parallel to each side, thus leaving tongues. The latter may alternatively be arranged towards the centres of the sides of the plate.

The plate is mounted on a frame and the cut-out ends of the tongues are fixedly connected with the frame. The point of application of the force is then formed by the portion of the plate outside the tongues. The tongues are provided with strain gauges.

The coordinates of the point of application of the force which calls up the deformations of the tongues can be calculated from the measurement signals supplied by the assembly of strain gauges.

Such a device is adapted to the calculation of the coordinates of a point of application and renders it possible to process measurement signals issued by several strain gauges suitably distributed over the surface of the plate collectively, without taking into account the intensity of the applied force. The point of application only is considered.

SUMMARY OF THE INVENTION

The invention has for its object to provide one or several different commands depending on the intensity of the applied force and generated through pressure by the user. For providing commands to mass-marketed devices, it is desirable for these control devices to be inexpensive.

This object is achieved by means of a device as described in the opening paragraph and characterized in that it comprises means for supporting the said remaining portion and for leaving the cut-out portion free for receiving an applied force F, thus enabling an inclination of the latter portion around the connection area, the said measurement signals varying as a function of the inclination of the said cut-out portion relative to the remaining portion.

The device is thus very easy to use and to manufacture. A control unit is available which supplies an electric signal which is proportional to or a function of the applied force. Its cost is reduced. There is no component subject to mechanical wear.

Starting from this simple structure, it is possible to repeat the same structure or to provide other slits in the cut-out portions for realising devices having increased control possibilities. It is thus possible to construct keyboards.

Thus the device may comprise at least two slits which partly surround two respective cut-out portions while retaining a common connection area between the said two cut-out portions and the remaining portions, the common connection area forming a common axis of inclination. By taking into account the polarity of the measurement signal supplied by the gauges, two commands are thus available from a single gauge.

Similarly, at least one cut-out portion may itself be provided with at least one additional slit which partly surrounds a respective additional cut-out portion while retaining an additional connection area with an additional remaining portion of the said cut-out portion, the additional connection area forming an additional pivot axis for the said additional cut-out portion.

Such a device renders it possible to combine one command with another command.

When the device is fitted with two cut-out portions by means of two slits so that a common connection area remains forming a common axis, it is possible for the two cut-out portions to serve in their turn collectively as a support for realising two additional slits which free two additional cut-out portions having an additional common connection area. The latter then forms another pivot axis for the additional cut-out portions. The two axes are preferably at right angles to one another. The device then forms an assembly of the universal joint type.

These different aspects of the invention as well as other aspects will be explained in more detail with reference to the embodiments described below.

BRIEF DESCRIPTION OF THE DRAWINGS

The invention will be better understood by reference to the following Figures which are given as non-limitative examples and in which.

DESCRIPTION OF THE PREFERRED EMBODIMENTS

Figure 1:
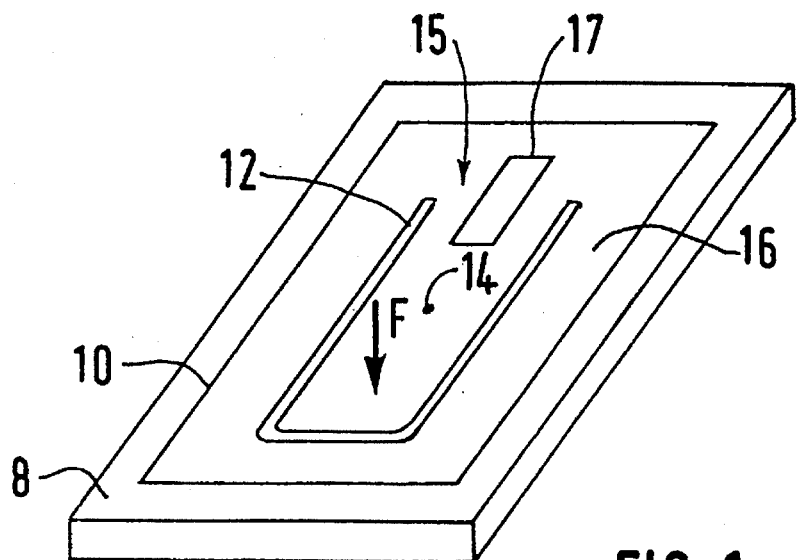
FIG. 1 is a perspective view of a device with one slit according to the invention.

FIG. 1 shows a frame 8 on which a plate 10 is fixed, formed from a material suitable for accommodating resistance strain gauges and having a desired flexibility, for example, a printed circuit board. A cut-out portion 14 is provided in the plate by means of a slit 12 which surrounds the cut-out portion 14 almost completely. This portion has a U-shape in FIG. 1. The shape of the cut-out portion is immaterial. Since the slit is not closed upon itself, a connection area 15 remains which serves as an axis of inclination for the cut-out portion 14. The portion of the plate which does not comprise the cut-out portion 14 constitutes a remaining portion 16. Since the latter is supported by the frame 8, the cut-out portion 14 will bend about the connection area 15 when a force F is applied to this portion 14.

A resistance bridge 17 with strain gauge is provided at the area of the connection 15, i.e. in a zone where major deformations take place. The strain gauge bridge may thus be situated either on the cut-out plate portion or on the remaining portion, or may straddle the connection area between the two portions. The strain gauges supply measurement signals which are proportional to (or more generally, a function of) the inclination of the cut-out portion, i.e. to the intensity of the applied force. These measurement signals are used as command signals for controlling other equipment.

Figure 2:
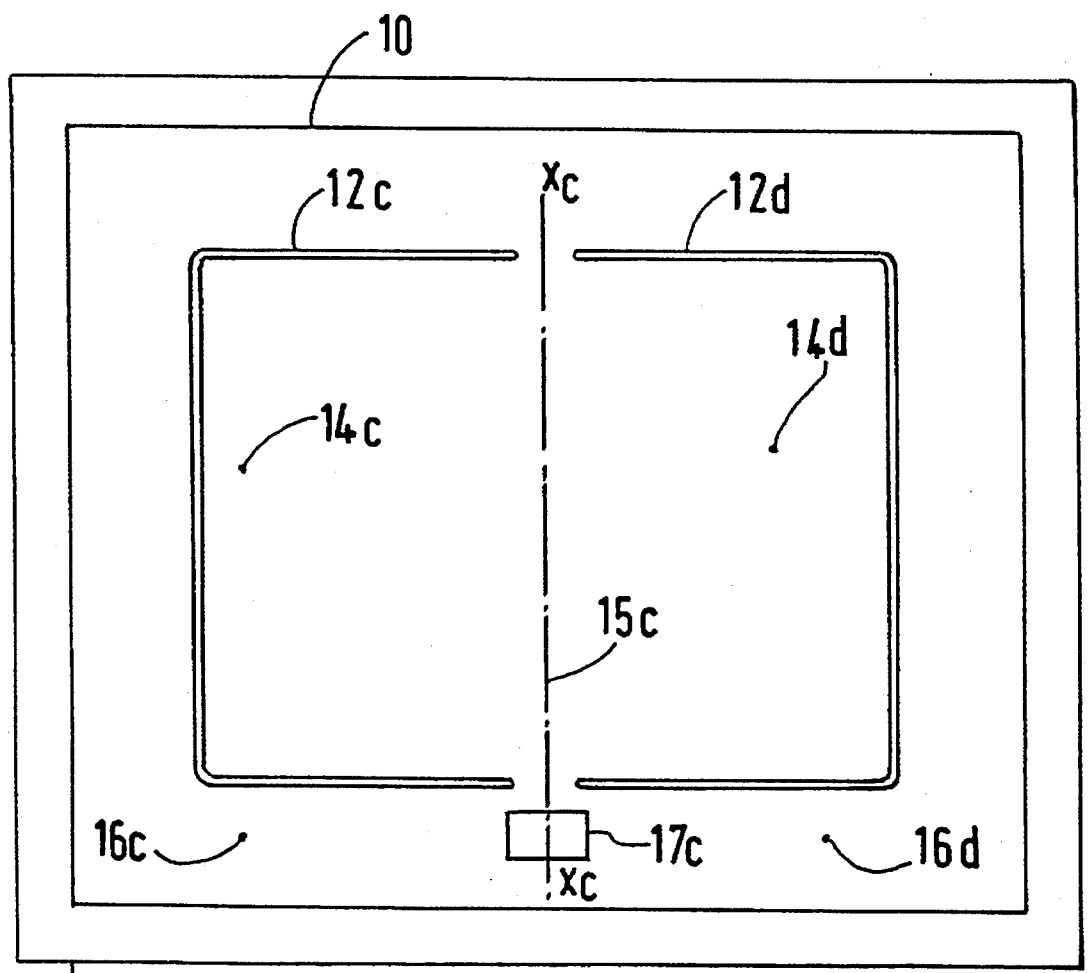
FIGS. 2, 3 are two diagrams showing a device with two slits having one axis and two axes of inclination, respectively.

The control capability can be doubled through the use of a single strain gauge bridge arranged on a connection area which is common to two portions which were partly cut out by means of two oppositely arranged slits. FIG. 2 shows two U-shaped slits 12c, 12d arranged so that their respective connection areas merge so as to form the connection area 15c. The two cut-out portions 14c, 14d may be inclined simultaneously (axis Xc—Xc) by a force applied on one or the other cut-out portion. A single strain gauge 17c is arranged adjacent the location where the cut-out portions 14c, 14d and the remaining portions 16c, 16d meet. The polarity of the measurement signal supplied by the gauge 17c renders it possible to differentiate between actions carried out on one or the other cut-out portion. This arrangement may be used, for example, for realising the respective increase and decrease of a control signal.

Figure 3:
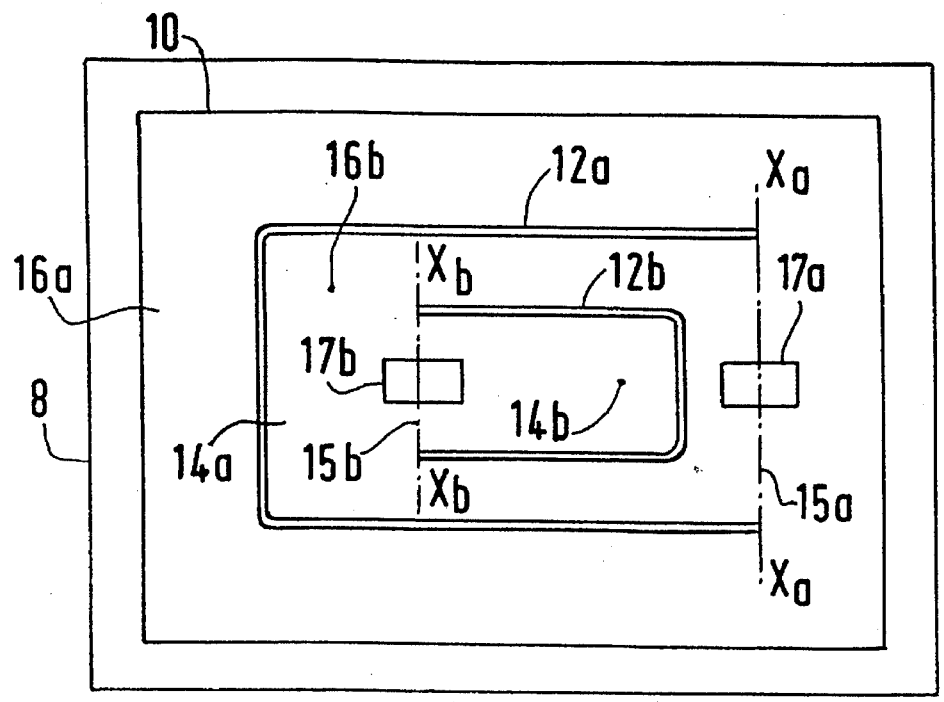

The two slits in an alternative embodiment may be disposed on the plate such that one surrounds the other slit at least partly. FIG. 3 is a diagram of such an arrangement in which the two axes of inclination Xa—Xa and Xb—Xb are separate. One cut-out portion 14b is cut out inside the cut-out portion 14a. It is then necessary to use two strain gauges 17a, 17b. This device has the advantage on the one hand that the device is made compact and on the other hand that two commands, which one wants to combine, are rendered mutually dependent. One of the commands may be, for example, rough tuning and the other command fine tuning.

Figure 4:
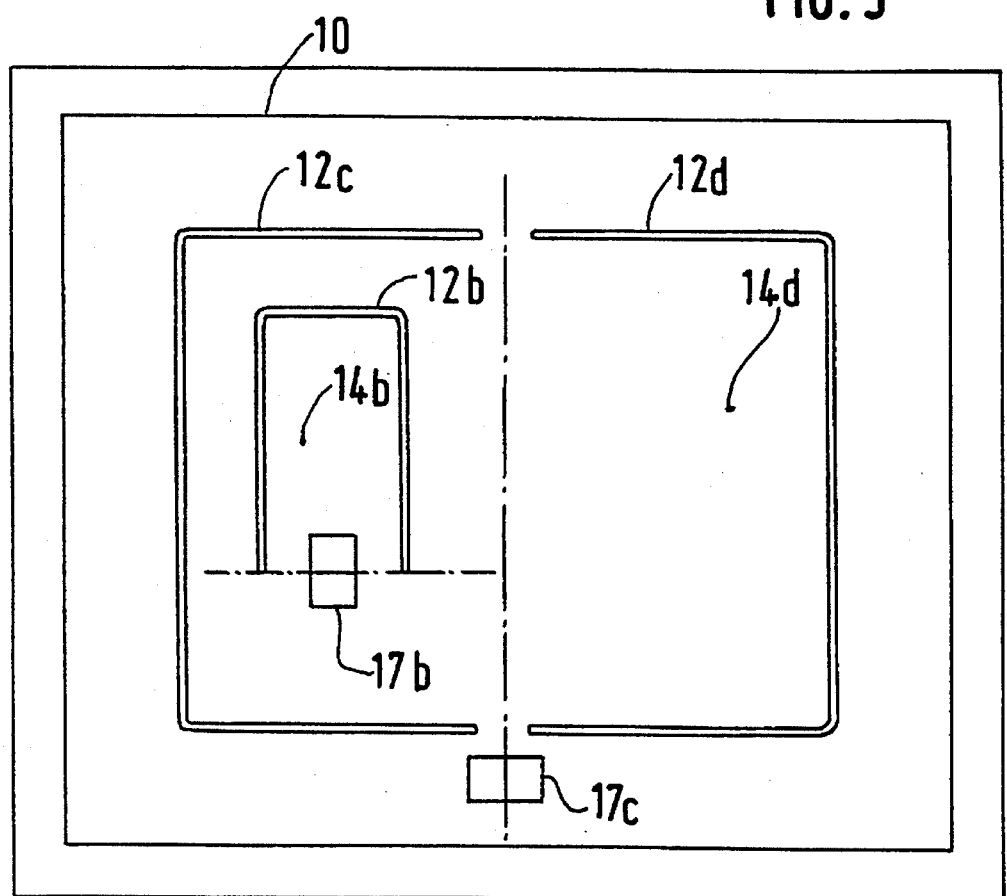
FIG. 4 is a diagram showing a device with three slits and two axes of inclination.

FIG. 4 shows another embodiment which comprises a different arrangement of elements already discussed individually with reference to FIGS. 2 and 3. Similar elements are provided with the same reference numerals.

Figure 5:
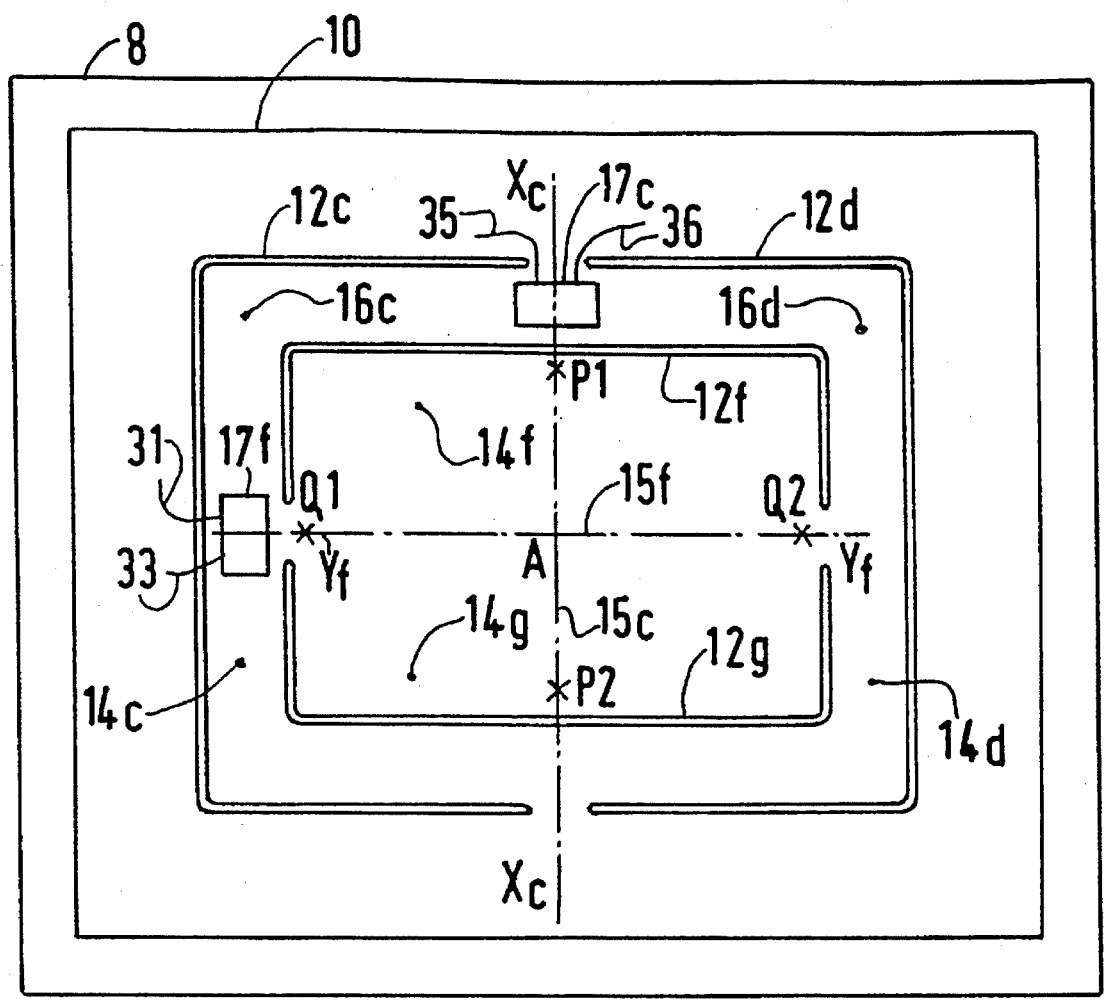
FIG. 5 is a diagram showing a device with four slits and two mutually perpendicular axes of inclination.

FIG. 5 shows a preferred embodiment in which two devices analogous to that shown in FIG. 2 are arranged one inside the other. There are again two slits 12c, 12d which surround two respective cut-out portions 14c, 14d which can bend around an axis of inclination Xc—Xc. The assembly of the two cut-out portions 14c, 14d in its turn serves as a support for realising two additional slits 12f, 12g which surround two additional cut-out portions 14f, 14g. The latter have an additional connection area 15f in common. An additional strain gauge 17f placed in the vicinity of the saddle between the two slits 12f, 12g provide measurement signals proportional to the force applied to the cut-out portion 14f, 14g which bend around an additional axis Yf—Yf. To provide a device which acts as a universal joint, the slits are so arranged that the two axes Xc—Xc and Yf—Yf are mutually perpendicular. Thus a pressure exerted at P1 or at P2 causes an inclination of the portions 14f, 14g around the axis Yf—Yf, and a pressure exerted at Q1 or at Q2 causes an inclination of the portions 14c, 14d (and thus also of the portions 14f, 14g) around the axis Xc13 Xc. When the force is applied on the lines P1–P2 and Q1–Q2 inside the area bounded by the slits 12f, 12g, four independent proportional commands are available, or more generally, commands which are a function of the applied force. Outside the lines P1–P2 and Q1–Q2 and on the said surface, the application of a force calls up a combination of the said commands.

Figure 6:
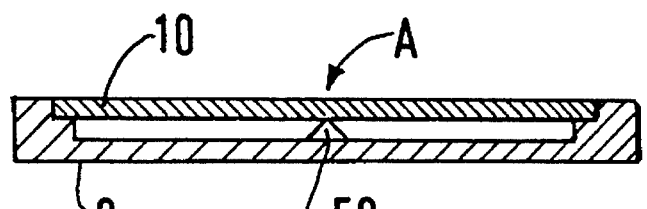
FIG. 6 is a diagram of a device with the plate resting on a pivot.

The inclinations around the axes Xc—Xc and Yf—Yf may be facilitated (FIG. 6) by the provision of a pivot stud 50 below the plate 10 at the point of intersection A of the two axes.

Figure 7:
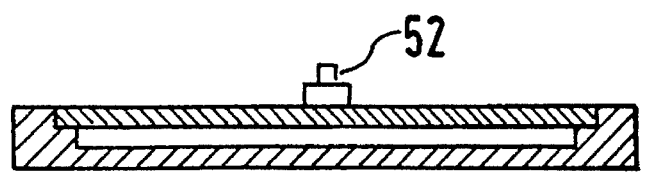
FIG. 7 is a diagram of a device with the plate provided with a pushbutton.

It is possible in addition to provide a pushbutton 52 on the plate 10 at point A, which forms a neutral point for the application of the forces (FIG. 7), for validating the control signals generated by one of the inclinations. The actions of the pushbutton 52 and of the pivot stud 50 may be combined.

Figure 8:
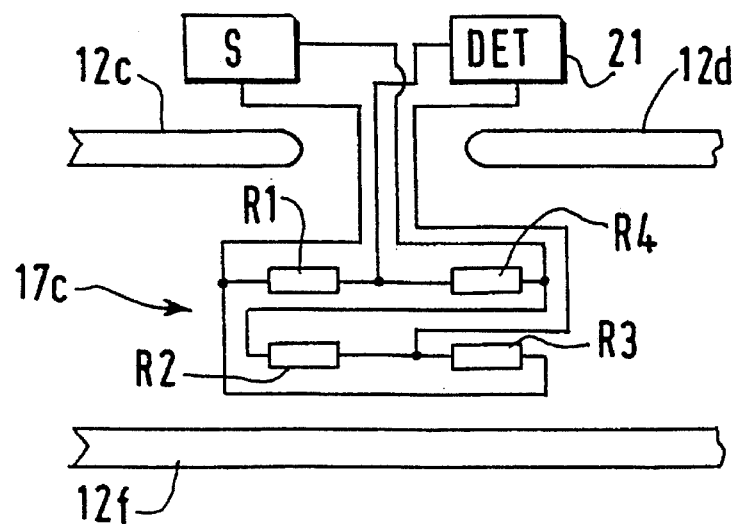
FIGS. 8 and 9 are two diagrams showing two devices each comprising a resistor bridge with a strain gauge arranged on one side and on both sides of the slits.
Figure 9:
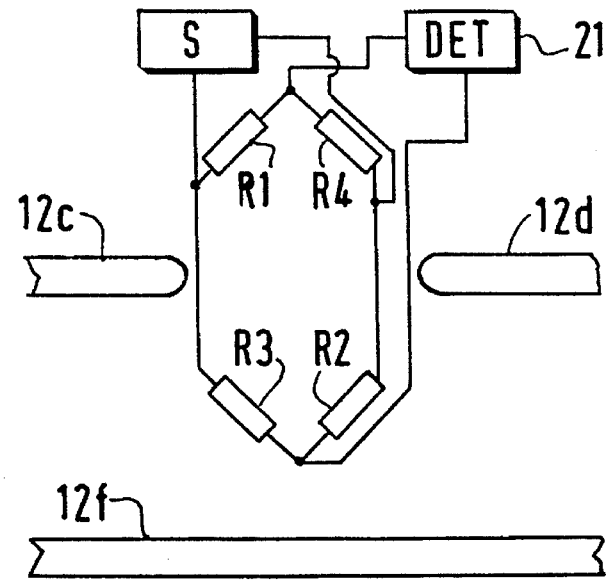

The arrangement of the strain gauges is shown in more detail in FIGS. 8 and 9, which refer to the embodiment of FIG. 5. The explanations are equally applicable to the other embodiments. A gauge is formed by four resistor elements arranged as a Wheatstone bridge. FIG. 8 shows an arrangement of the bridge which renders possible a measurement of deformation by bending. For this purpose the entire bridge is arranged in the space lying between, on the one hand, the slits 12c and 12d and, on the other hand, the slit 12f. A diagonal of the bridge is connected to a source S and a detection circuit 21 determines voltage imbalances in the bridge and generates the measurement signal as a function of the bending of the plate.

FIG. 9 shows a bridge arrangement capable of measuring torsional deformation. For this purpose, the bridge is distributed over both sides of the saddle situated between the slits 12c and 12d. In an analogous manner, a detection circuit 21 determines voltage imbalances in the bridge and generates a measurement signal proportional to the torsion of the plate.

Figure 10:
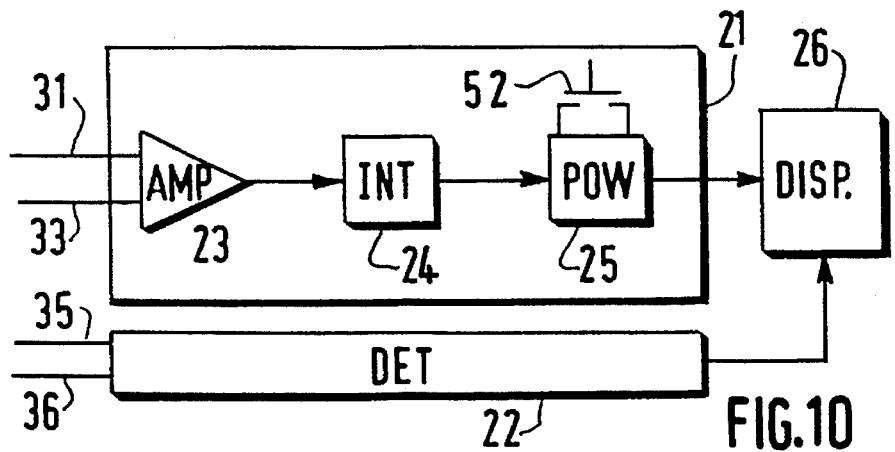
FIG. 10 is a circuit diagram of a control circuit with wire connection.

The strain gauges 17c, 17f of FIG. 5 are connected to two detection circuits 21, 22, respectively, shown in FIG. 10. The detection circuits 21 and 22 are formed, for example, by amplifiers with low-frequency filters (integrators), supplying control signals to devices which are to be operated.

FIG. 10 is an example of a circuit diagram of a detection circuit DET connected to the terminals 31, 33 of the first resistance bridge 17c. The controlled device 26 is, for example, a display monitor DISP. The deformation of the plate leads to a potential difference between the terminals 31 and 33, which is amplified by the amplifier 23, smoothed or integrated by passing through a low-frequency filter, for example an integrator INT 24, and finally an adapted electronic power circuit POW 25 supplies the suitable signal to the controlled device 26. A second detection circuit DET 22 similar to the circuit 21 operates in the same manner for the second bridge 17f with strain gauges (FIG. 5). The pushbutton 52 may serve to validate the measurements. To have available an incremental control signal, the integrator 24 is capable of totalizing incremental/decremental values.

The touch control device according to the invention may be a remote control device or may be incorporated in a control keyboard. The device controlled in this manner may be:

- an electromechanical device for high-accuracy positioning: microscope platform,
- an electric power regulator: lighting, motor, electric appliance,
- a power lifting engine such as a pivoting or overhead crane,
- a cursor on a flat screen or cathode-ray tube screen of a computer or TV. In this last case, the object may be to select a function or an object from a menu presented on the screen.

If a crane or a TV screen is involved, the connection between the control device and the device to be operated may be effected either by a direct wire or cable link, or by a remote-control link with an infrared or ultrasonic beam as used in remote control systems for TV or audio equipment.

Figure 11:
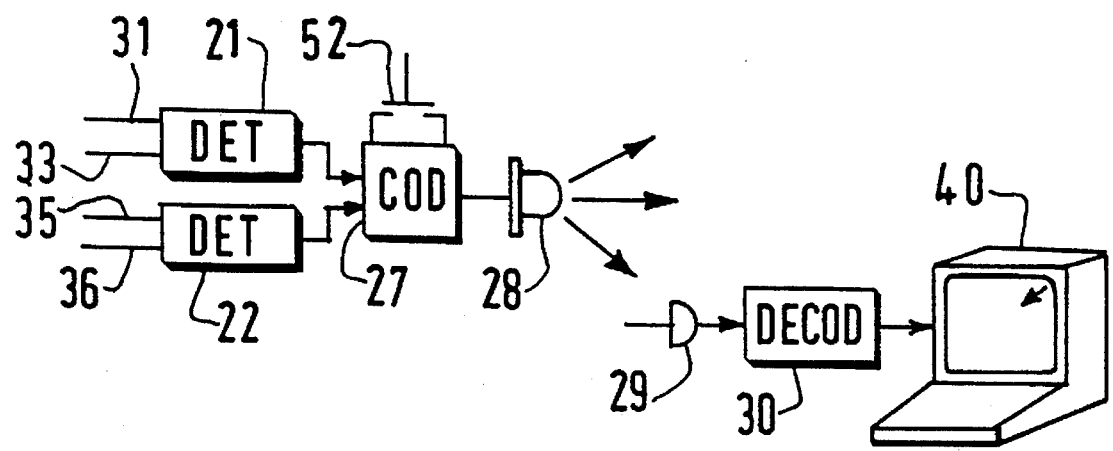
FIG. 11 is a diagram showing the principle of remote control without wire.

FIG. 11 is an example of a remote control device without wire connection, for example, utilizing an infrared beam. The voltage difference between the terminals 31 and 33 (or between the terminals 35 and 36) is detected by the detection circuit 21 (or detection circuit 22, as applicable). The outputs of the two detection circuits 21, 22 are then coded by an encoder 27 which sends voltage or current pulses to the infrared light emitting diode 28. These light pulses are received by a photosensitive diode 29, identified by a decoding circuit 30, and the latter sends to the control equipment 40, for example a computer screen provided with a pointer, the movement or position commands corresponding to the mechanical action carried out on the device.

Figure 12:
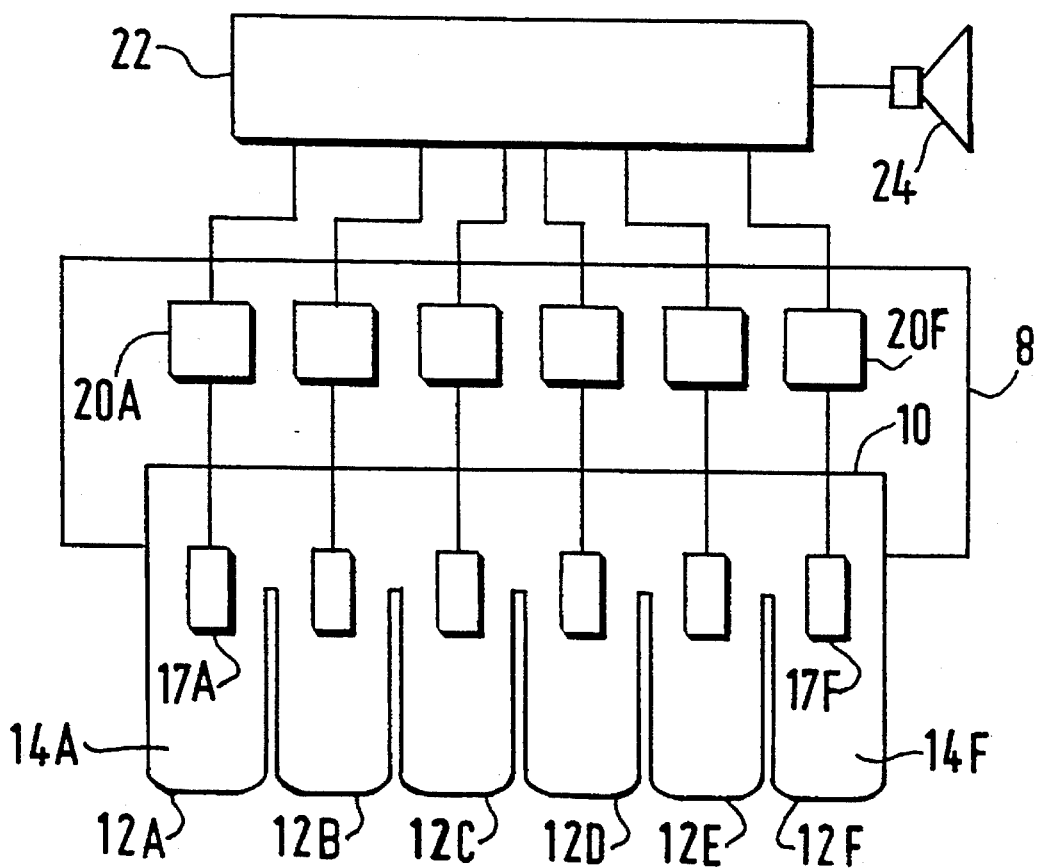
FIG. 12 is a diagram of a keyboard formed by a plurality of devices having slits.

A combination of several touch command devices as described above renders possible the realisation of combinations with novel and multiple possibilities. Thus, for example, a plurality of devices according to FIG. 1 may be combined so as to realise a control keyboard. For this purpose (FIG. 12), a series of slits 12A–12F is provided at the side of a plate 10, which slits define a series of cut-out portions 14A–14F arranged side by side in the manner of a piano keyboard. The support 8 leaves the cut-out portions 14A–14F free to be inclined relative to their respective connection areas. Each cut-out portion 14A–14F has its own strain gauge 17A–17F. Each measurement signal supplied by each gauge is connected, for example, to a sound generator 20A–20F. The sound generators are connected to a mixer 22 which drives a transmission member 24, for example, a loudspeaker. A signal supplied by one gauge being a function of the intensity of the force and persisting throughout the duration of application of this force, it is thus possible to realise a musical keyboard at low cost, for example, for an organ. The keyboard may also be used for other functions, for example, for writing, addressing commands, or other functions.

Generally, by combining several embodiments described above, it is possible to realise control units or remote control units for operating a TV, a video recorder, a hifi set, or any such equipment.

We claim:

1. A touch control device comprising a plate (10) capable of receiving an applied force (F), at least one slit (12) which surrounds a partly cut-out portion (14) in the plate (10) while retaining a connection area (15) with a remaining portion (16) of the plate (10), and strain gauge detectors (17) for supplying measurement signals which are a measure of deformations of the plate (10), characterized in that it comprises means (8) for supporting the said remaining portion (16) and for leaving the cut-out portion (14) free for receiving the applied force (F), thus enabling an inclination of the cut-out portion around the connection area (15), the said measurement signals varying as a function of the inclination of the said cut-out portion (14) relative to the remaining portion (16), further characterized in that at least one cut-out portion (14a) is itself provided with at least one additional slit (12b) which partly surrounds a respective additional cut-out portion (14b) while retaining an additional connection area (15b) with an additional remaining portion (16b) of the said cut-out portion (14a), the additional connection area (15b) forming an additional pivot axis (Xb—Xb) for the said additional cut-out portion (14b).

2. A touch control device comprising a plate (10) capable of receiving an applied force (F), at least one slit (12) which surrounds a partly cut-out portion (14) plate (10) while retaining a connection area (15) with a remaining portion (16) of the plate (10), and strain gauge detectors (17) for supplying measurement signals which are a measure of deformations of the plate (10), characterized in that it comprises means (8) for supporting the said remaining portion (16) and for leaving the cut-out portion (14) free for receiving the applied force (F), thus enabling an inclination of the cut-out portion around the connection area (15), the said measurement signals varying as a function of the inclination of the said cut-out portion (14) relative to the remaining portion (16), further characterized in that it comprises at least two slits (12c, 12d) which partly surround two respective cut-out portions (14c, 14d) while retaining a common connection area (15) between the said two cut-out portions and the remaining portions (16c, 16d), the common connection area forming a common axis of inclination (Xc, Xc), still further characterized in that the two cut-out portions (14c, 14d) are collectively provided with two additional slits (12f, 12g) which partly surround two respective additional cut-out portions (14f, 14g) while retaining an additional connection area (15f) common to the two said additional cut-out portions and to the additional remaining portions (16c, 16d), the common additional connection area (15f) forming a common additional axis of inclination (Yf—Yf).

3. A device as claimed in claim 2, characterized in that it comprises two cut-out portions (14c, 14d) with a common axis of inclination (Xc—Xc) and two additional cut-out portions (14f, 14g) which have a common axis of inclination (Yf—Yf), which two axes are at right angles to one another.

4. A device as claimed in claim 3, characterized in that the plate rests on a pivot stud (50) at the point of intersection (A) of the two axes.

5. A touch control device comprising a plate (10) capable of receiving an applied force (F), at least one slit (12) which surrounds a partly cut-out portion (14) in the plate (10) while retaining a connection area (15) with a remaining portion (16) of the plate (10), and strain gauge detectors (17) for supplying measurement signals which are a measure of deformations of plate (10), characterized in that it comprises means (8) for supporting the said remaining portion (16) and for leaving the cut-out portion (14) free for receiving applied force (F), thus enabling an inclination of the cut-out portion around the connection area (15), the said measurement signals varying as a function of the inclination of the said cut-out portion (14) relative to the remaining portion (16), further characterized in that at least one of the connection areas is provided with a validation pushbutton.

6. A keyboard, characterized in that it comprises a plurality of keys (14A–14F), each key comprising a touch control device comprising a plate (10) capable of receiving an applied force (F), at least one slit (12) which surrounds a partly cut-out portion (14) in the plate (10) while maintaining a connection area (15) with a remaining portion (16) of the plate (10), and strain gauge detectors (17) for supplying measurement signals which are a measure of deformations of the plate (10), characterized in that it comprises means (8) for supporting the said remaining portion (16) and for leaving the cutout portion (14) free for receiving the applied force (F), thus enabling an inclination of the cut-out portion around the connection area (15), the said measurement signals varying as a function of the inclination of the said cut-out portion (14) relative to the remaining portion (16).

* * * * *